US011839258B2

(12) United States Patent
Cheney et al.

(10) Patent No.: US 11,839,258 B2
(45) Date of Patent: *Dec. 12, 2023

(54) RAPID-ENTRY FOOTWEAR HAVING AN ARM FOR EXPANDING AN OPENING

(71) Applicant: FAST IP, LLC, Lindon, UT (US)

(72) Inventors: Craig Cheney, Lindon, UT (US); Seth Munger, Springville, UT (US)

(73) Assignee: FAST IP, LLC, Lindon, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/982,185

(22) Filed: Nov. 7, 2022

(65) Prior Publication Data
US 2023/0055164 A1 Feb. 23, 2023

Related U.S. Application Data

(63) Continuation of application No. 17/015,894, filed on Sep. 9, 2020, now Pat. No. 11,490,680.

(60) Provisional application No. 62/897,881, filed on Sep. 9, 2019.

(51) Int. Cl.
*A43B 11/00* (2006.01)
*A43B 3/24* (2006.01)
*B25J 19/02* (2006.01)
*A43B 23/02* (2006.01)

(52) U.S. Cl.
CPC .............. *A43B 11/00* (2013.01); *A43B 3/248* (2013.01); *A43B 23/0265* (2013.01); *B25J 19/022* (2013.01)

(58) Field of Classification Search
CPC ..... A43B 3/248; A43B 11/00; A43B 23/0265; A43B 23/047
USPC ........................................... 36/51, 138
See application file for complete search history.

(56) References Cited

U.S. PATENT DOCUMENTS

| | | | | |
|---|---|---|---|---|
| 1,686,175 A | * | 10/1928 | Read ...................... | A43B 3/101 36/58.5 |
| 2,736,110 A | * | 2/1956 | Hardimon .............. | A43B 23/08 36/58.5 |
| 2,829,448 A | * | 4/1958 | Minera ................... | A43B 11/00 36/58.5 |
| 2,920,402 A | * | 1/1960 | Minera ................... | A43B 3/102 36/58.5 |
| 5,181,331 A | * | 1/1993 | Berger ................... | A43C 11/16 24/712.1 |
| 7,823,299 B1 | * | 11/2010 | Brigham ................. | A43B 3/24 36/11.5 |
| 7,975,403 B2 | * | 7/2011 | Mosher ................... | A43B 23/26 36/51 |
| 9,351,532 B2 | * | 5/2016 | Mokos ............... | A43B 23/0205 |
| 10,455,898 B1 | * | 10/2019 | Orand .................. | A43C 11/004 |
| 10,905,192 B1 | * | 2/2021 | Cheney ................ | A43B 3/248 |
| 11,490,680 B2 | * | 11/2022 | Cheney ................ | A43B 11/00 |
| 2007/0271822 A1 | * | 11/2007 | Meschter ........... | A43B 23/0225 36/47 |
| 2007/0277394 A1 | * | 12/2007 | Hansen ................ | A43C 11/006 36/8.3 |
| 2012/0055044 A1 | * | 3/2012 | Dojan ................ | A43B 23/0245 36/83 |
| 2014/0101975 A1 | * | 4/2014 | Ueda ..................... | A43B 13/141 36/131 |

(Continued)

*Primary Examiner* — Marie D Bays

(57) ABSTRACT

A shoe upper having a plurality of arms that expand the shoe opening when the topline of the upper is compressed toward the sole portion of the shoe.

20 Claims, 12 Drawing Sheets

(56) References Cited

U.S. PATENT DOCUMENTS

| | | | |
|---|---|---|---|
| 2016/0128424 A1* | 5/2016 | Connell | A43B 13/20 12/146 B |
| 2016/0374427 A1* | 12/2016 | Zahabian | A43B 3/24 36/102 |
| 2018/0110287 A1* | 4/2018 | Hopkins | A43B 13/141 |
| 2018/0110292 A1* | 4/2018 | Beers | A43B 23/088 |
| 2018/0289109 A1* | 10/2018 | Beers | A43B 11/00 |
| 2020/0000178 A1* | 1/2020 | Pratt | A43B 3/242 |
| 2021/0112914 A1* | 4/2021 | Cheney | A43B 23/027 |
| 2021/0235811 A1* | 8/2021 | Oh | A43B 11/00 |
| 2021/0378356 A1* | 12/2021 | Cheney | A43C 11/008 |

\* cited by examiner

RAPID-ENTRY FOOTWEAR HAVING AN ARM FOR EXPANDING AN OPENING

CROSS-REFERENCE TO RELATED APPLICATION

This application is a continuation of, claims priority to and the benefit of U.S. Ser. No. 17/015,894 filed Sep. 9, 2020 and entitled "RAPID-ENTRY FOOTWEAR HAVING AN ARM FOR EXPANDING AN OPENING." U.S. Ser. No. 17/015,894 claims priority to and the benefit of U.S. Provisional Patent Application No. 62/897,881 filed Sep. 9, 2019 and entitled "RAPID-ENTRY FOOTWEAR HAVING ONE OR MORE ARMS FOR EXPANDING AN OPENING." All of the aforementioned applications are incorporated herein by reference in their entireties for all purposes.

FIELD

The present disclosure relates to footwear, and more particularly to rapid-entry footwear having an arm for expanding an opening.

BACKGROUND

Whether due to inconvenience or inability, donning and doffing of shoes, including tying or otherwise securing the same, may be undesirable and/or present difficulties to some individuals. The present disclosure addresses this need.

SUMMARY

Example embodiment of the present disclosure comprise a rapid-entry shoe having a sole portion, an upper coupled to the sole portion, the upper defining a topline. In some embodiments, the rapid-entry shoe comprises a plurality of crossing arms, each arm coupled to the sole portion and to the upper at or adjacent to the topline. In some embodiments, a portion of the upper consists of a plurality of woven arms, each arm coupled to the sole portion and to a resilient textile coupled at the topline.

In some embodiments, the rapid-entry shoe has a collapsed configuration in which the topline is expanded to facilitate reception of a foot of an individual donning the rapid-entry shoe, and an uncollapsed configuration in which the topline is unexpanded to retain the foot within the rapid-entry shoe. In some embodiments, the plurality of intersecting arms sheer past each other between the collapsed configuration and the uncollapsed configuration. In some embodiments, the rapid-entry shoe is biased toward the uncollapsed configuration.

In some embodiments, the crossing arms are separated by a negative space, the negative space being greater in the collapsed configuration than in the uncollapsed configuration.

In some embodiments, the sole portion does not permit relative movement between the plurality of intersecting arms at the sole portion. In some embodiments, the topline is configured to permit relative movement between the plurality of intersecting arms at the topline.

In some embodiments, at least one arm is configured to act on to a forward portion of the topline and at least one arm is configured to act on to a rearward portion of the topline, to thereby draw the forward portion and the rearward portion toward one another in the uncollapsed configuration.

BRIEF DESCRIPTION OF THE DRAWINGS

The accompanying drawings may provide a further understanding of example embodiments of the present disclosure and are incorporated in, and constitute a part of, this specification. In the accompanying drawings, only one rapid-entry shoe (either a left shoe or a right shoe) may be illustrated, however, it should be understood that in such instances, the illustrated shoe may be mirror-imaged so as to be the other shoe. The use of like reference numerals throughout the accompanying drawings is for convenience only, and should not be construed as implying that any of the illustrated embodiments are equivalent. The accompanying drawings are for purposes of illustration and not of limitation.

DETAILED DESCRIPTION

Figure 1A:
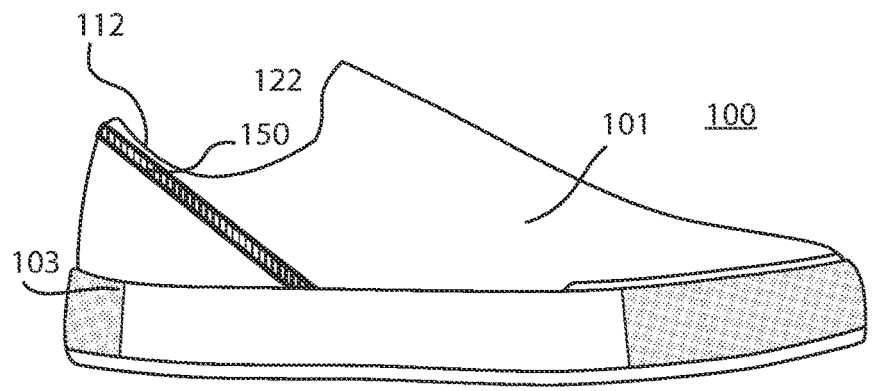
FIGS. 1A and 1B illustrate an example embodiment of a rapid-entry shoe having an arm, in uncollapsed and collapsed configurations, respectively.

Example embodiments of the present disclosure are described in sufficient detail in this detailed description to enable persons having ordinary skill in the relevant art to practice the present disclosure, however, it should be understood that other embodiments may be realized and that mechanical and chemical changes may be made without departing from the spirit or scope of the present disclosure. Thus, this detailed description is for purposes of illustration and not of limitation.

For example, unless the context dictates otherwise, example embodiments described herein may be combined with other embodiments described herein. Similarly, references to "example embodiment," "example embodiments"

and the like indicate that the embodiment(s) described may comprise a particular feature, structure, or characteristic, but every embodiment may not necessarily comprise the particular feature, structure, or characteristic. Moreover, such references may not necessarily refer to the same embodiment(s). Any reference to singular includes plural embodiments, and any reference to plural includes singular embodiments.

Any reference to coupled, connected, attached or the like may be temporary or permanent, removeable or not, non-integral or integral, partial or full, and may be facilitated by one or more of adhesives, stitches, hook and loop fasteners, buttons, clips, grommets, zippers and other means known in the art or hereinafter developed.

As used herein, the transitional term "comprising", which is synonymous with "including," "containing," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention.

No claim limitation is intended to invoke 35 U.S.C. 112(f) or pre-AIA 35 U.S.C. 112, sixth paragraph or the like unless it explicitly uses the term "means" and includes functional language.

In describing example embodiments of the rapid-entry footwear, certain directional terms may be used. By way of example, terms such as "right," "left," "medial," "lateral," "front," "back," "forward," "backward," "rearward," "top," "bottom," "upper," "lower," "up," "down," and the like may be used to describe example embodiments of the rapid-entry footwear. These terms should be given meaning according to the manner in which the rapid-entry footwear is most typically designed for use, with the rapid-entry footwear on a user's foot and with the user's shod foot disposed on or ready for placement on an underlying surface. Thus, these directions may be understood relative to the rapid-entry footwear in such use. Similarly, as the rapid-entry footwear is intended primarily for use as footwear, terms such as "inner," "inward," "outer," "outward," "innermost," "outermost," "inside," "outside," and the like should be understood in reference to the rapid-entry footwear's intended use, such that inner, inward, innermost, inside, and the like signify relatively closer to the user's foot, and outer, outward, outermost, outside, and the like signify relatively farther from the user's foot when the rapid-entry footwear is being used for its intended purpose. Notwithstanding the foregoing, if the foregoing definitional guidance is contradicted by an individual use herein of any of the foregoing terms, the term should be understood and read according to the definition that gives life and meaning to the particular instance of the term.

As used herein, unless the context dictates otherwise, a "rapid-entry shoe" refers to an athleisure shoe, a casual shoe, a formal shoe, a dress shoe, a heel, a sports/athletic shoe (e.g., a tennis shoe, a golf shoe, a bowling shoe, a running shoe, a basketball shoe, a soccer shoe, a ballet shoe, etc.), a walking shoe, a sandal, a boot, or other suitable type of shoe. Additionally, a rapid-entry shoe can be sized and configured to be worn by men, women, or children.

As used herein, unless the context dictates otherwise, a "sole portion" of a rapid-entry shoe refers to an outsole or portions thereof, a midsole or portions thereof, an insole or portions thereof, a wedge or portions thereof, or other suitable structure disposed between and/or adjacent to the foregoing parts of a rapid-entry shoe, for example, an insole or an internal cushion.

As used herein, unless the context dictates otherwise, a "rear portion of an upper" refers to any rear portion of an upper, for example, a heel portion or backstrap, including a topline thereof.

As used herein, unless the context dictates otherwise, the term "crossing" (and its derivatives) refers to crossing, relative passing, weaving, meshing, interconnecting, overlapping, intersecting, or the like.

Example embodiments of the present disclosure comprise a rapid-entry shoe having a sole portion, an upper coupled to the sole portion, and at least one arm, with the upper defining a topline, and the topline defining an opening for reception of a foot of an individual donning the rapid-entry shoe.

Example embodiments of the present disclosure comprise a pattern of a plurality of arms forming, coupled to, or integrated within, an upper of a rapid-entry shoe, the arms configured to expand an opening of the rapid-entry shoe (e.g., in one or a plurality of directions) when a topline of the upper is compressed toward a sole portion of the rapid-entry shoe.

Thus, in example embodiments, a rapid-entry shoe of the present disclosure has a collapsed configuration in which the upper (e.g., a topline) is expanded to facilitate reception of a foot of an individual donning the rapid-entry shoe and further has an uncollapsed configuration in which the upper (e.g., a topline) is unexpanded to retain the foot within the rapid-entry shoe. In example embodiments, an opening (e.g., defined by a topline) of a rapid-entry shoe has a greater circumference in a collapsed configuration than in an uncollapsed configuration. In various embodiments, one or a plurality of arms are arranged more vertically in the uncollapsed configuration than in the collapsed configuration. Similarly, in various embodiments, one or a plurality of arms are arranged more horizontally in the collapsed configuration than in the uncollapsed configuration.

In example embodiments, an arm has an elongated shape and is comprised of one or more rigid or semi-rigid fibers or materials, for example, nylon, polypropylene, polyethylene, polyurethane, carbon fiber, shape-memory polymer, thermoplastic rubber (TPR), silicone, styrene-ethylene/butylene-styrene (SEBS), acetal homopolymer/polyoxymethylene, aluminum, TPU, TPC-ET, acrylic resin, rubber, ABS, or polycarbonate, or another rigid or semi-rigid fiber or material known in the art or hereinafter developed. In general, a material for an arm can be selected to provide greater axial strength or stiffness (e.g., to support an upper, to retain a foot, and/or to bias an upper to an uncollapsed configuration) than lateral strength or stiffness (e.g., to enable expansion of an upper for reception of a foot).

In each of the described embodiments, an arm can be located on a lateral side of a rapid-entry shoe 100, a medial side of a rapid-entry shoe 100, or both lateral and medial sides of a rapid-entry shoe 100 (e.g., lateral and medial sides not coupled, lateral and medial sides coupled, or lateral and medial sides comprised of the same arm extending continuously between lateral and medial sides).

Figure 1B:
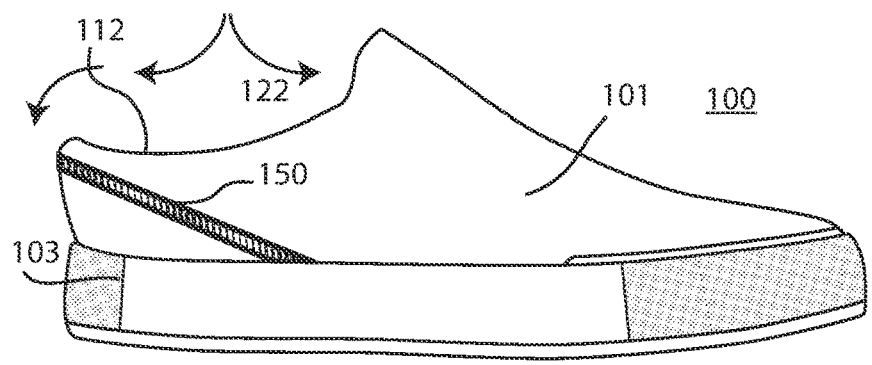

With reference now to FIGS. 1A and 1B, example embodiments of a rapid-entry shoe 100 comprise a sole portion 103, an upper 101, and an arm 150. In example embodiments, the arm 150 extends diagonally (i.e., at an angle) between (and is coupled at or near) the sole portion 103 and a topline 112 (or adjacent a topline 112), the topline 112 defined by the upper 101 and the topline 112 defining an opening 122 for reception of a foot of an individual donning the rapid-entry shoe 100.

In example embodiments, the sole portion 103 at or near which the arm 150 is coupled does not exhibit or facilitate any elongation, while the topline 112 at or near which the arm 150 is coupled does exhibit or facilitate elongation (e.g., all or partially around its perimeter). Thus, when the topline 112 is compressed toward the sole portion 103 in a collapsed configuration of rapid entry shoe 100 (FIG. 1B), the arm 150 imparts elongation or stretching of the topline 112 to thereby expand the perimeter of the opening 122 of the rapid entry shoe 100 for reception of a foot.

Figure 1C:
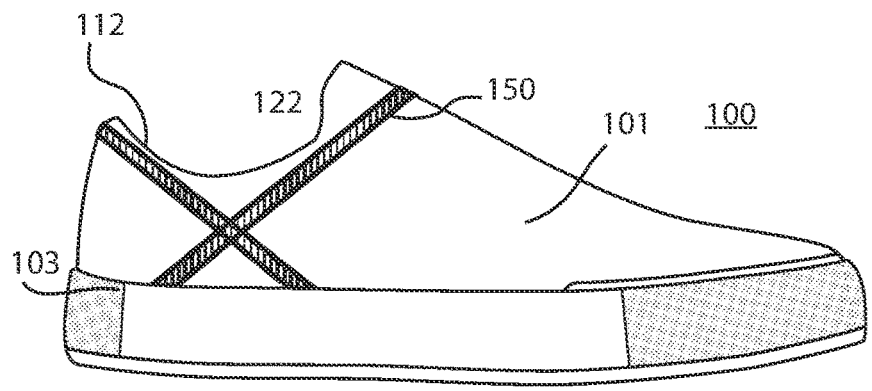
FIGS. 1C and 1D illustrate an example embodiment of a rapid-entry shoe having crossing arms, in uncollapsed and collapsed configurations, respectively.
Figure 1D:
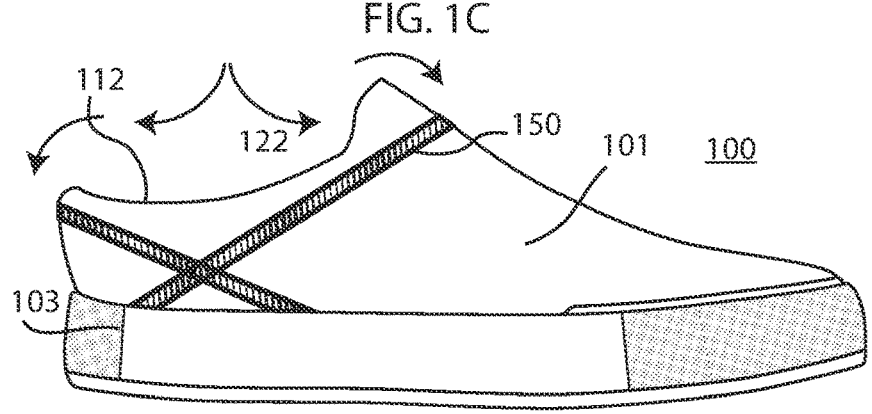

With reference now to FIGS. 1C and 1D, example embodiments of the present disclosure comprise a pair of arms 150, each crossing the other and extending diagonally (i.e., at an angle) between (and being coupled at or near) the sole portion 103 and a topline 112 (or adjacent a topline 112), the topline 112 defined by the upper 101 and the topline 112 defining an opening 122 for reception of a foot of an individual donning the rapid-entry shoe 100. The arms 150 may cross each other adjacent to, and in contact with, each other, or be separated by one or more layers of the upper 101 of the rapid-entry shoe 100.

In example embodiments, as noted above, the sole portion 103 at or near which the arms 150 are coupled does not exhibit or facilitate any elongation, while the topline 112 at or near which the arms 150 are coupled does exhibit or facilitate elongation (e.g., all or partially around its perimeter). Thus, similar to above, when the topline 112 is compressed toward the sole portion 103 in a collapsed configuration of rapid entry shoe 100 (FIG. 1D), the arms 150 impart elongation or stretching of the topline 112 to thereby expand the perimeter of the opening 122 of the rapid entry shoe 100 for reception of a foot. Stated another way, a downward pressure on topline 112 tends to spread the arms 150 apart, while a release of the downward pressure on topline 112 tends to return the arms 150 together.

In example embodiments, an arm is arranged more vertical than horizontal relative to the sole portion. Stated differently, in example embodiments, an angle measured between an arm and an axis perpendicular to the sole portion is less than 90 degrees, or less than 45 degrees. In this regard, an angle measured between crossing arms over an axis perpendicular to the sole portion can be less than 90 degrees in example embodiments. Such embodiments may provide vertical support in an uncollapsed configuration and also maximize expansion in a collapsed configuration.

Figure 2A:
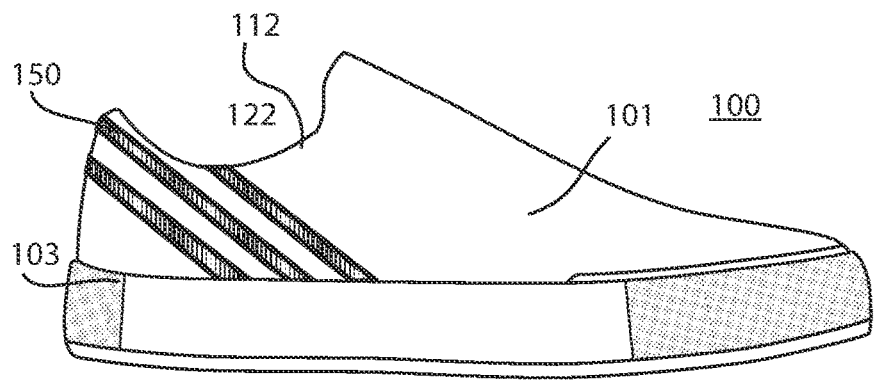
FIGS. 2A and 2B illustrate an example embodiment of a rapid-entry shoe having a plurality of aligned arms, in uncollapsed and collapsed configurations, respectively.
Figure 2B:
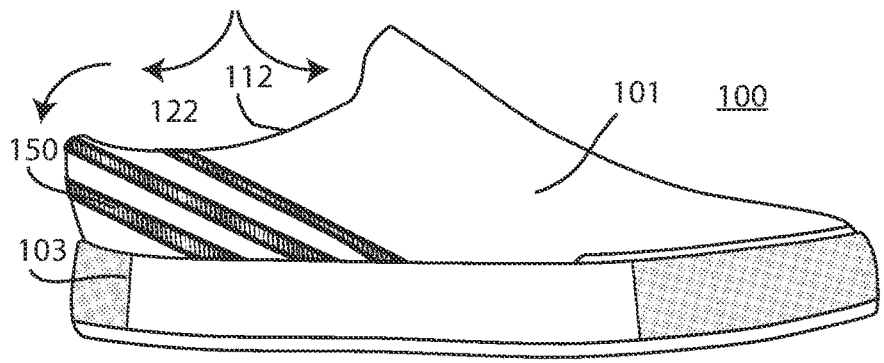

With reference now to FIGS. 2A and 2B, still further example embodiments of the present disclosure provide for a plurality of aligned arms 150, each arm 150 extending diagonally (i.e., at an angle) between (and being coupled at or near) the sole portion 103 and a topline 112 (or adjacent a topline 112) of the upper 101. In example embodiments, the arms individually act as described supra to expand the perimeter of an opening 122 of rapid-entry shoe 100 for reception of a foot when in a collapsed configuration (FIG. 2B), and then contract the perimeter of the opening 122 of rapid-entry shoe 100 to retain the foot within the rapid-entry shoe 100 when in an uncollapsed configuration (FIG. 2A).

Figure 2C:
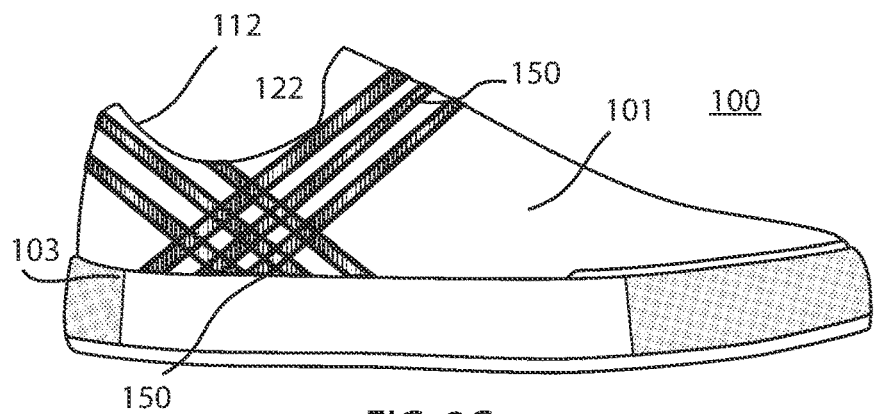
FIGS. 2C and 2D illustrate an example embodiment of a rapid-entry shoe having a plurality of crossing arms, in uncollapsed and collapsed configurations, respectively.
Figure 2D:
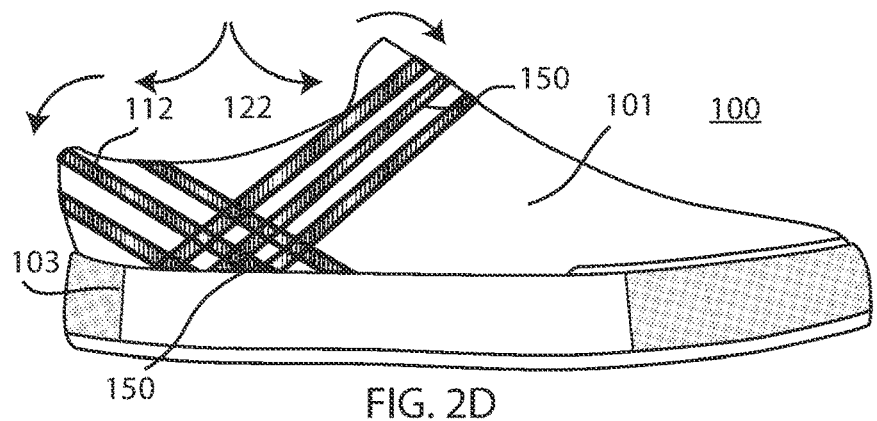
Figure 3A:
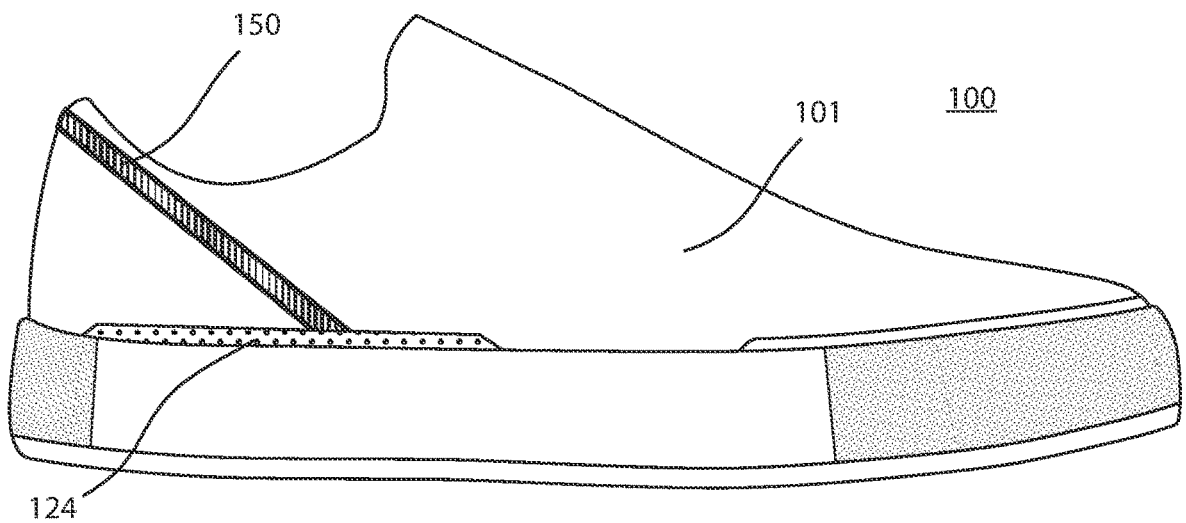
FIGS. 3A and 3B illustrate an example embodiment of a rapid-entry shoe having an arm and crossing arms, respectively, coupled to a static portion of the upper.
Figure 3B:
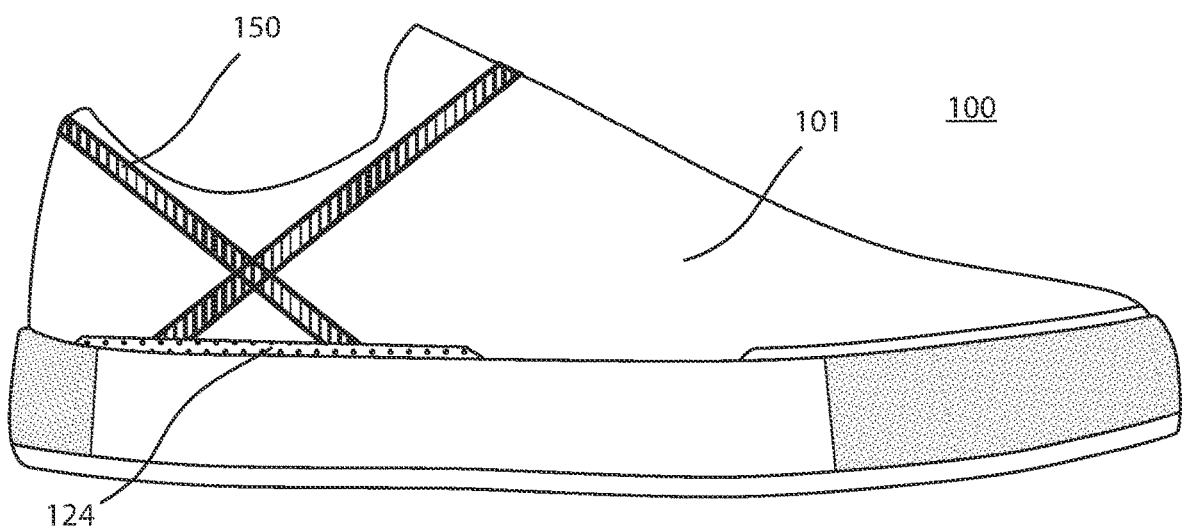
Figure 4A:
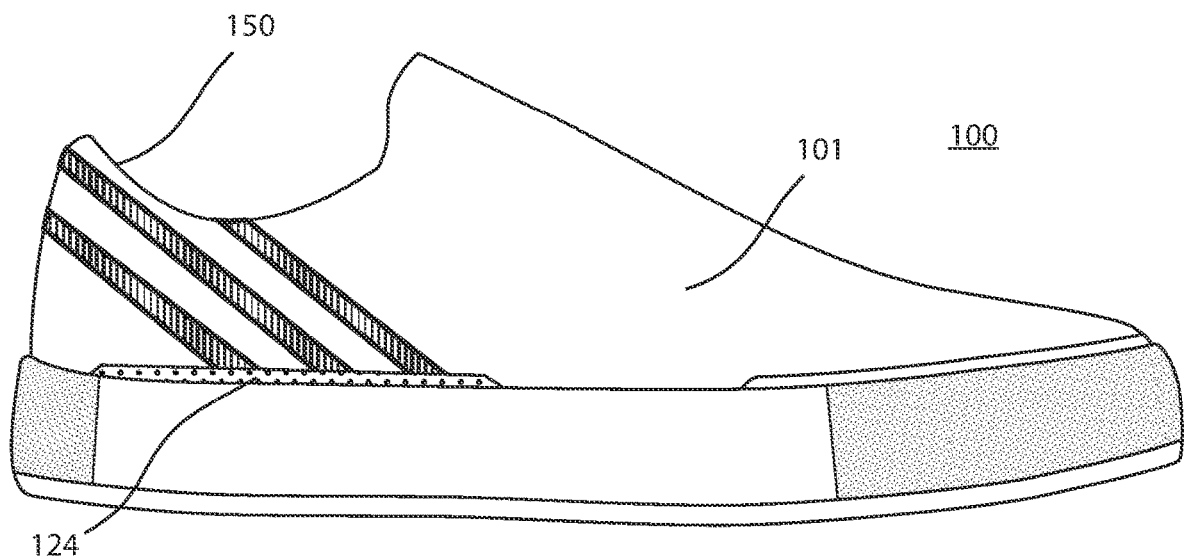
FIGS. 4A and 4B illustrate an example embodiment of a rapid-entry shoe having a plurality of aligned arms and a plurality of crossing arms, respectively, coupled to a static portion of the upper.
Figure 4B:
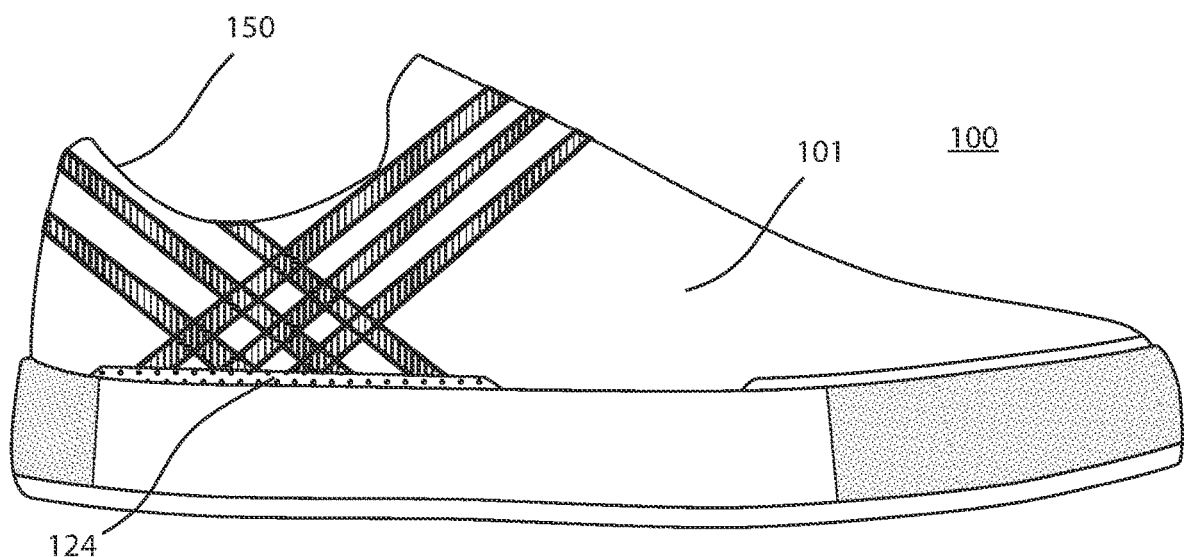

With reference now to FIGS. 2C and 2D, still further example embodiments of the present disclosure provide for a plurality of crossing arms 150, each arm 150 extending diagonally (i.e., at an angle) between (and being coupled at or near) the sole portion 103 and a topline 112 (or adjacent a topline 112) of the upper 101. In example embodiments, the arms individually act as described supra, and collectively act as a "finger trap" to expand the perimeter of an opening 122 of rapid-entry shoe 100 for reception of a foot when in a collapsed configuration (FIG. 2D), and then contract the perimeter of the opening 122 of rapid-entry shoe 100 to retain the foot within the rapid-entry shoe 100 when in an uncollapsed configuration (FIG. 2C).

In some embodiments, the arms are coupled to the upper by methods or processes currently adapted to the making of footwear, including but not limited to gluing, knitting, stitching or other methods or processes that enable the relative movement described. In other embodiments, the arms do not overlie any additional layer or material and thus constitute the entirety of entirety the rapid-entry shoe (or a discrete section of the rapid-entry shoe).

Thus, in example embodiments, a plurality of crossing arms 150 can form a portion of an upper (e.g., either where no other upper material is present or all or partially overlying a distinct upper material). In some embodiments, the plurality of crossing arms 150 can be continuous between edges of the portion (e.g., woven, not knitted between a sole portion and a topline). In some embodiments, a portion comprised or consisting of a plurality of crossing arms 150 can be configured to expand in a direction perpendicular to its collapse to a collapsed configuration. Stated another way, in example embodiments one or more arms are configured to provide outward flex of an opening of a rapid-entry shoe when downward force is applied to the opening. Stated yet another way, in example embodiments downward force applied to an opening of a rapid-entry shoe causes one or more arms to expand away from each other in order to expand the opening.

Figure 5A:
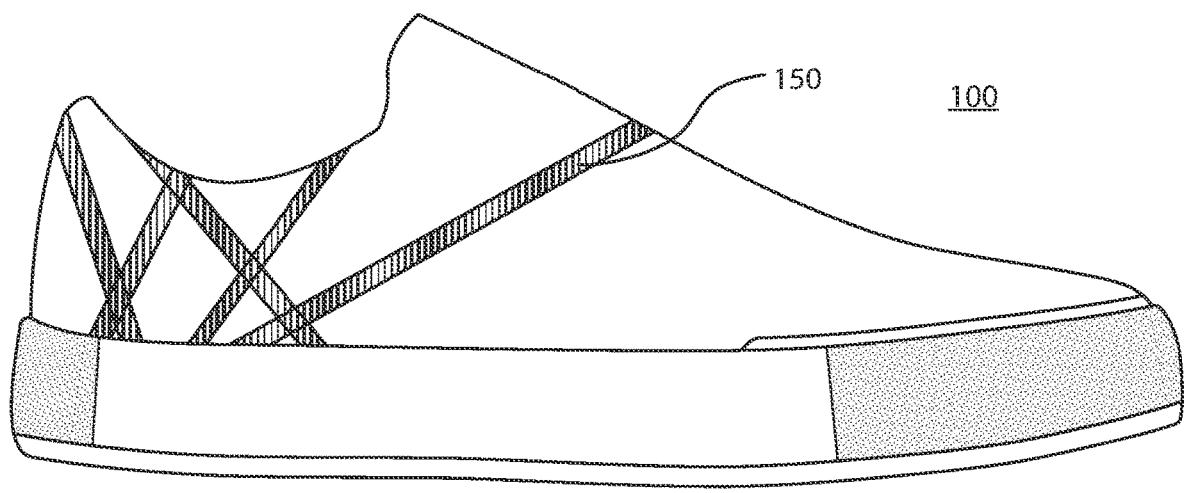
FIGS. 5A and 5B illustrate example embodiments of rapid-entry shoes having inconsistent crossing patterns.
Figure 5B:
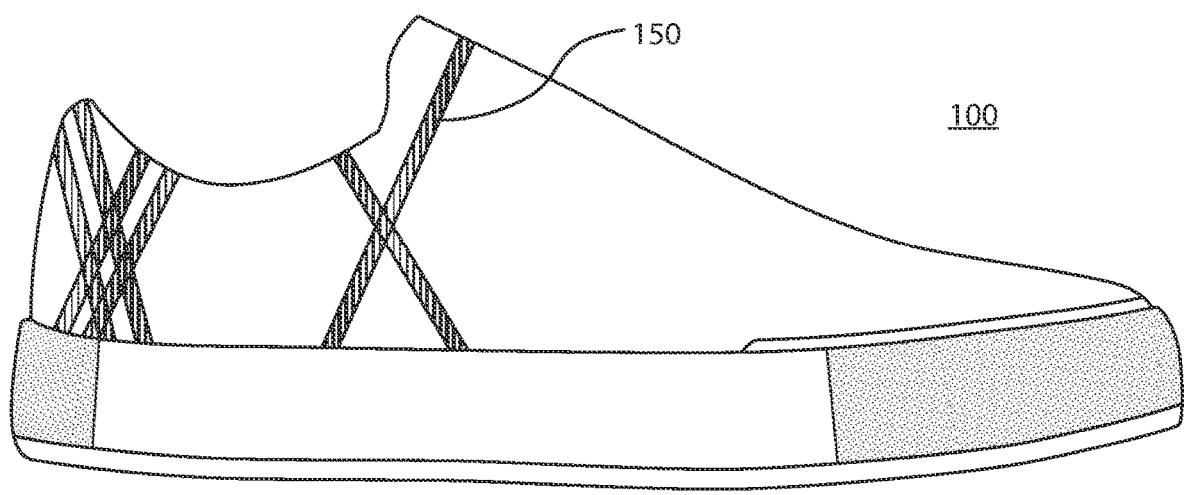

In some embodiments, and with reference to FIGS. 5A and 5B, a crossing pattern created by a plurality of crossing arms 150 is not constant between edges of a portion comprised or consisting of the plurality of crossing arms 150. In some embodiments, the ratio of arms angled a first direction is not 1:1 with arms angled a crossing direction. By way of example, a single arm can be crossed by a plurality of arms.

Inconsistency of a crossing pattern may contribute to a structural transition profile in and/or between collapsed and uncollapsed configurations (e.g., to accommodate a foot structure). For example, such inconsistency may create one or more flares in the crossing pattern (e.g., around a rear portion of an upper to lock a heel). Such inconsistency may also contribute to rapid-entry shoe 100 being biased to return from a collapsed configuration to an uncollapsed configuration.

Inconsistency of a crossing pattern may be created by one or more of variable spacing between some of a plurality of crossing arms 150 (e.g., a decrease in negative space between some of a plurality of crossing arms 150), heating (e.g., spot welding) between some of a plurality of crossing arms 150 (e.g., to prevent shear at discrete locations), and/or one or more distinct upper elements integrated into a crossing pattern (e.g., a stiffener, tensioning or cinching element). In still other embodiments, inconsistency of a crossing pattern may be created by one or more of coupling, injection, stitching or weaving of a secondary structure (e.g., a knit).

With momentary reference to FIGS. 3A, 3B, 4A and 4B, instead of being coupled directly to the sole portion, as described supra, the arms 150 of rapid-entry shoe 100 can be coupled to a static portion 124 of the upper 101.

Figure 6A:
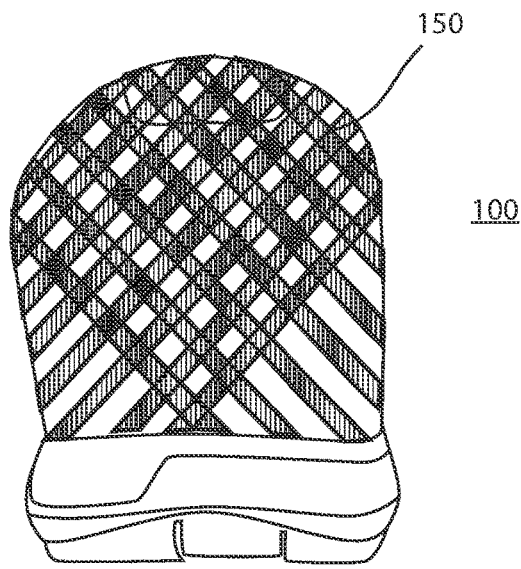
FIGS. 6A-6D illustrate various views of another example embodiment of a rapid-entry shoe having a plurality of arms extending around a rear portion of an upper.
Figure 6B:
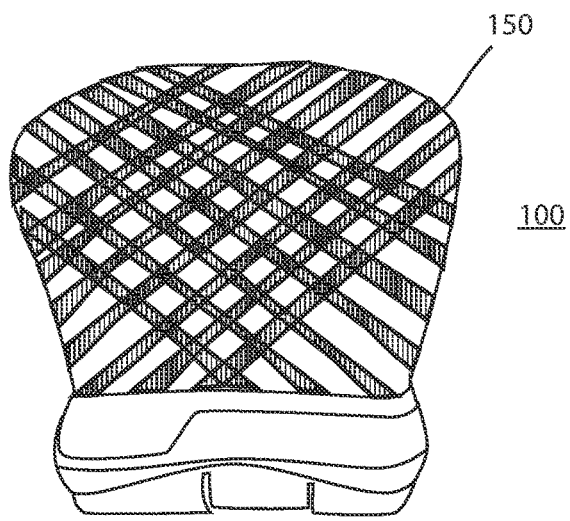
Figure 6C:
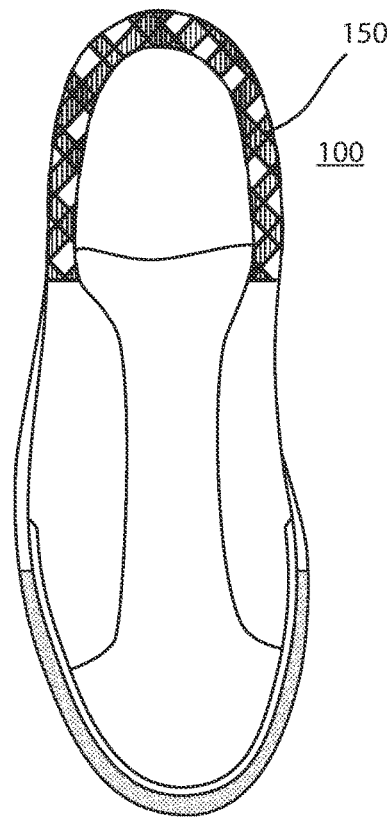
Figure 6D:
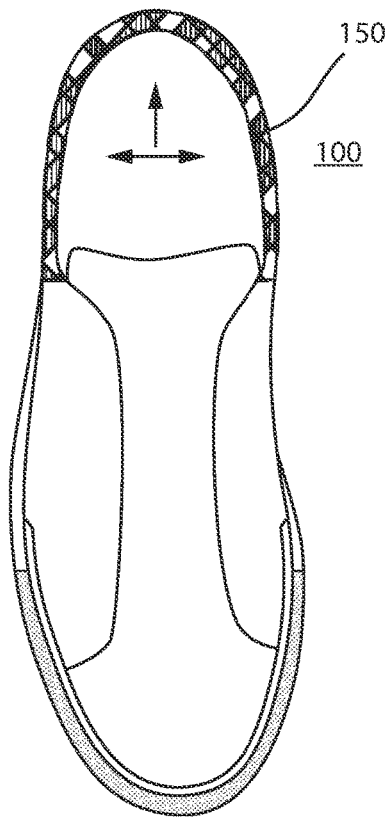

With reference to FIGS. 6A-6D, a plurality of arms 150 can extend completely around a rear portion of an upper. FIGS. 6A and 6C show views of such a rapid-entry shoe 100 in an uncollapsed configuration, and FIGS. 6B and 6D show additional views of the same rapid-entry shoe 100 in a collapsed configuration. In other embodiments, a plurality of arms 150 can extend completely around the circumference of an opening (e.g., defined by a topline) of a rapid-entry shoe.

Figure 7A:
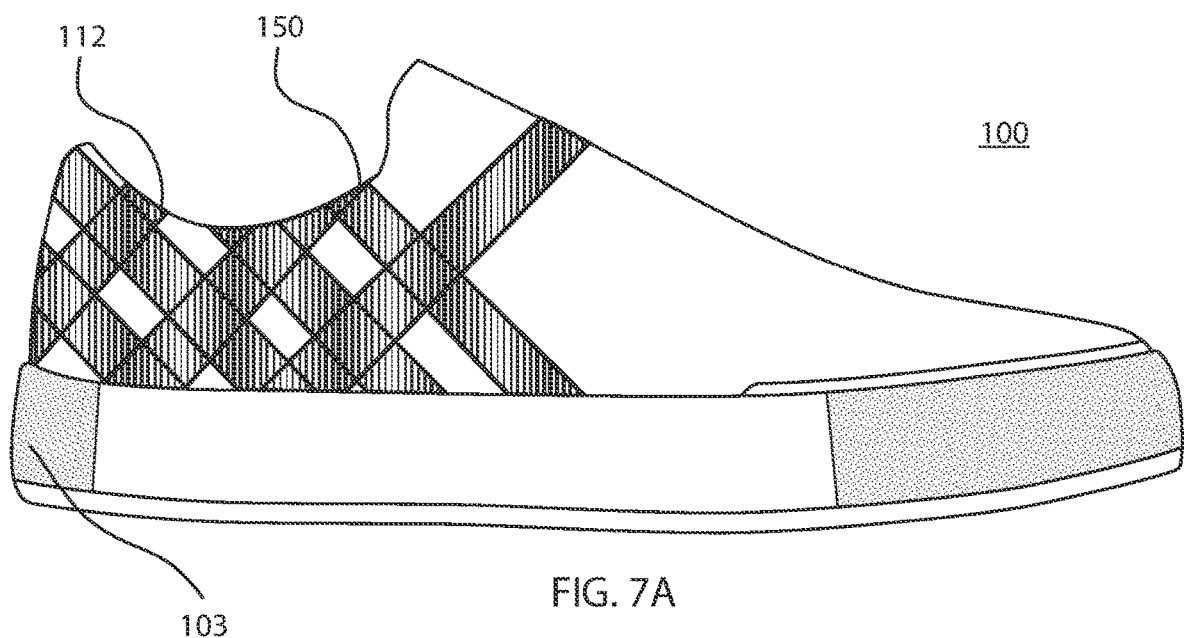
FIGS. 7A and 7B illustrate a plurality of crossing arms about the perimeter of the topline of example embodiments of rapid-entry shoes.

As described supra, an arm 150, or a plurality of arms 150 of a rapid-entry shoe 100 (e.g., apices or peaks formed by crossing arms), may extend from a sole portion 103 and terminate adjacent to a topline 112. In other embodiments, and with reference to FIG. 7A, an arm, or a plurality of arms (e.g., apices or peaks formed by crossing arms), may extend from a sole portion 103 and terminate at a topline 112. In example embodiments, a plurality of arms are configured to draw a forward portion of the topline 112 (i.e., a portion of the topline 112 having a positive slope as measured from or relative to a rearmost portion of an upper) and the rearward portion of the topline 112 (i.e., a portion of the topline 112 having a negative slope as measured from or relative to a rearmost portion of an upper) toward one another. In example embodiments, at least one arm is coupled to a forward portion of a topline 112 and at least one arm is coupled to a rearward portion of a topline 112, to thereby draw the forward portion and the rearward portion toward one another.

Figure 7B:
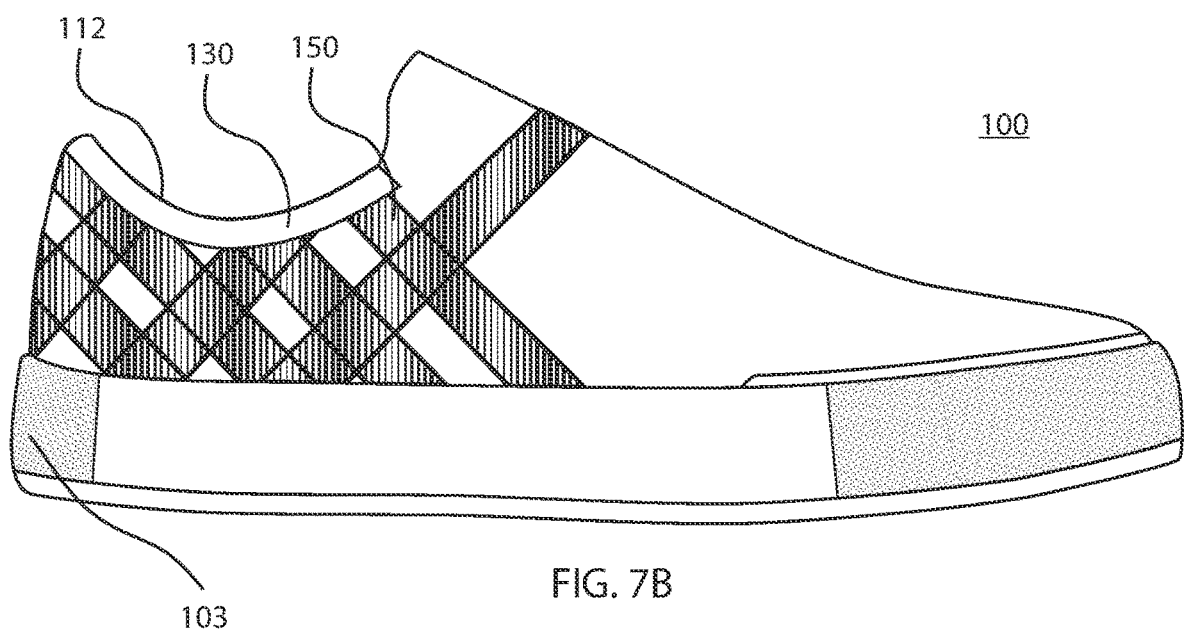

As described supra, the topline 112 may exhibit or facilitate elongation (e.g., all or partially around its perimeter). In some embodiments, the topline 112 is comprised of a textile (e.g., a connection membrane) that stretches along a first axis but may not (or may) stretch along a second, perpendicular axis. In other embodiments, the topline 112 is interrupted by one or more elastic gores or other materials that can stretch in multiple directions. In still other embodiments, the topline 112 is defined by an elastic member (e.g., an elastic cord). In this regard, and with reference to FIG. 7B, a plurality of arms can be coupled to a resilient textile or elastic gore or member 130 (each capable of perimetric elongation) all or partially circumscribing the topline 112, the resilient textile or elastic gore or member 130 providing elongation to the topline 112, in addition to stability to the arm(s) 150 (and to the upper).

Embodiments of the present disclosure provide for movement of an arm relative to a topline when the perimeter of opening 122 is expanded and contracted between collapsed and uncollapsed configurations, respectively. By way of example, an arm may be slideably coupled to a resilient textile or elastic gore or member (as described supra). In this regard, in a collapsed configuration a plurality of arms may be spaced apart from one another (i.e., have negative space between one another) along the resilient textile or elastic gore or member, while in an uncollapsed configuration the plurality of arms may not be spaced apart (or have less negative space between one another) from one another along the resilient textile or elastic gore or member.

In example embodiments, negative space between adjacent arms can be 2x, 3x, 4x or greater than the width of an adjacent arm. In example embodiments, negative space between adjacent arms 150 when rapid-entry shoe 100 is in a collapsed configuration can be 2x, 3x, 4x or greater than when rapid-entry shoe 100 is in an uncollapsed configuration.

In some embodiments, an arm may extend from a sole portion 103 to a topline 112 at a diagonal angle, comprise an arm apex wrapped around the topline 112, and extend at a different diagonal angle back to the sole portion 103 on the same side of the rapid-entry shoe 100. Wrapping an arm in this manner may lend itself to example embodiments wherein topline 112 comprises a resilient textile or elastic gore or member (as described supra) along which an arm apex may move when the perimeter of opening 122 is expanded and contracted between collapsed and uncollapsed configurations, respectively. In this regard, in a collapsed configuration a plurality of arm apices may be spaced apart from one another along the resilient textile or elastic gore or member, while in an uncollapsed configuration the plurality of arm apices may not be spaced apart from one another along the resilient textile or elastic gore or member.

In example embodiments, as described above, rapid entry shoe 100 is biased to return from a collapsed configuration (e.g., FIGS. 1B, 1D, 2B, 2D, 6B and 6D) to an uncollapsed configuration (e.g., FIGS. 1A, 1C, 2A, 2C, 6A and 6C) in which the perimeter of the opening 122 is smaller than it is in a collapsed configuration.

In example embodiments, a plurality of arms can be coupled to a resilient textile or elastic gore or member (each capable of perimetric elongation) all or partially circumscribing the topline 112, the resilient textile or elastic gore or member further contributing to rapid-entry shoe 100 being biased to return from a collapsed configuration to an uncollapsed configuration.

In some embodiments, a plurality of arms can cross anywhere along their respective lengths, and the crossing point can change when a rapid-entry shoe 100 is moving between collapsed and uncollapsed configurations. That is, when the rapid-entry shoe 100 is moving between collapsed and uncollapsed configurations, arms can shear past one another (e.g., relative sliding of crossing arms along their respective lengths). In this regard, the inter weaving of the arms, in some embodiments, may provide rebound as the arms press against each other in an inter woven manner, and thereby further contribute to the rapid-entry shoe 100 being biased to return from a collapsed configuration to an uncollapsed configuration. Stated differently, in some embodiments, a plurality of arms can act as a spring to return the rapid-entry shoe 100 from a collapsed configuration to an uncollapsed configuration (and/or prevent a rear portion of the upper from folding under a heel).

In some embodiments, a rapid-entry shoes comprises a pattern woven or stitched into the upper configured to bias the rapid-entry shoe toward the uncollapsed configuration.

In other embodiments, a resilient bootie can be coupled to the upper to bias the opening to return from a collapsed configuration to an uncollapsed configuration.

Figure 8A:
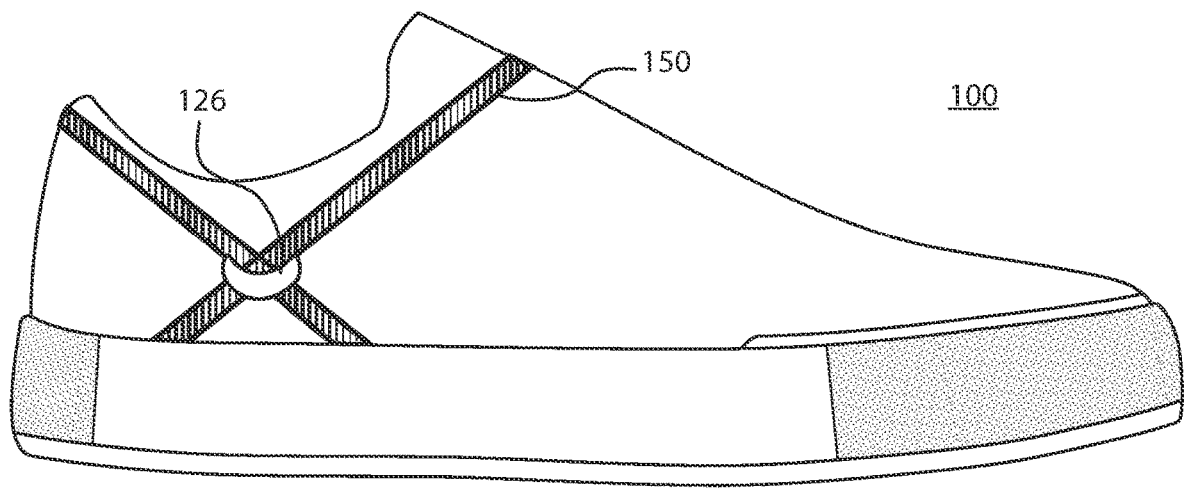
FIGS. 8A and 8B illustrate tethers of example embodiments of the present disclosure.
Figure 8B:
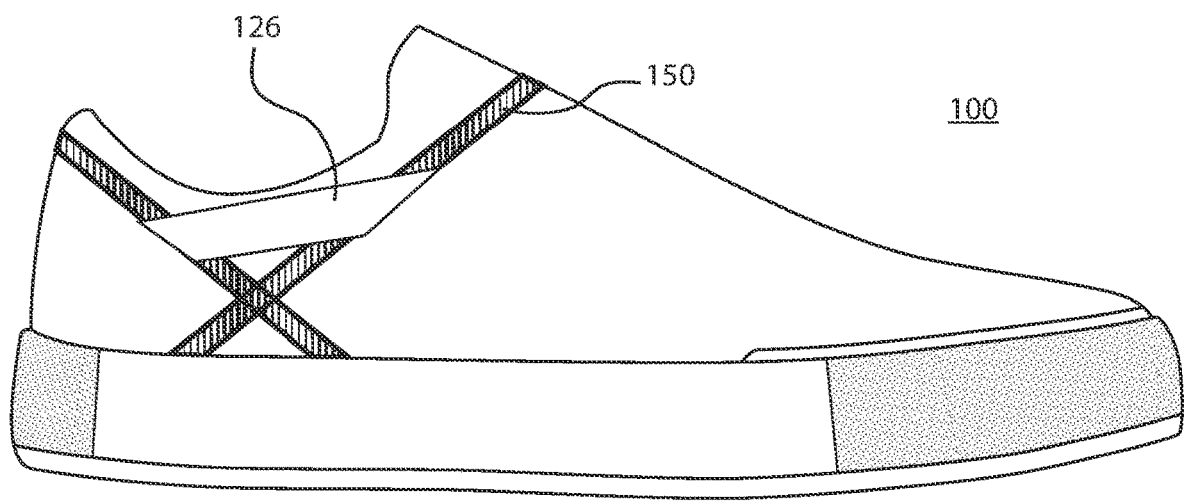
Figure 9A:
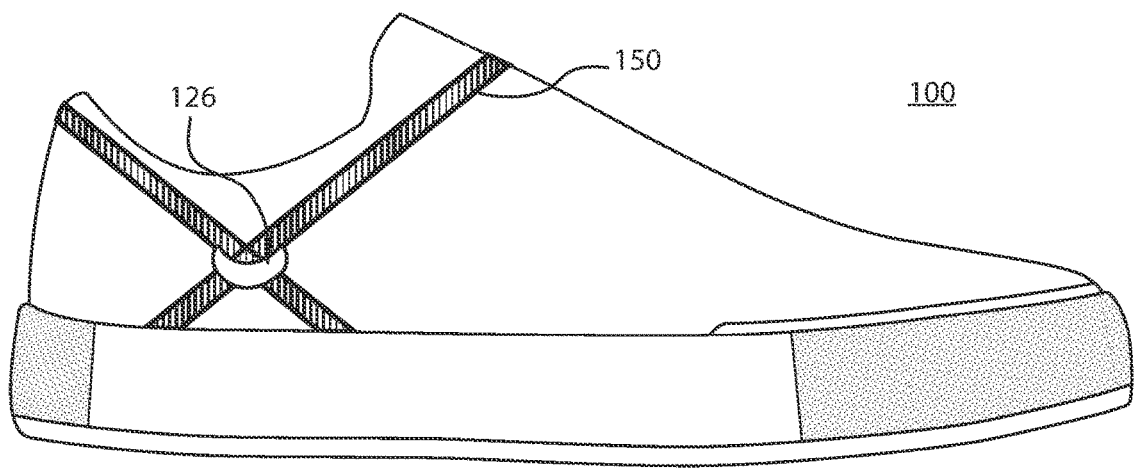
FIGS. 9A and 9B illustrate an example embodiment of a rapid-entry shoe having a tether, in uncollapsed and collapsed configurations, respectively.
Figure 9B:
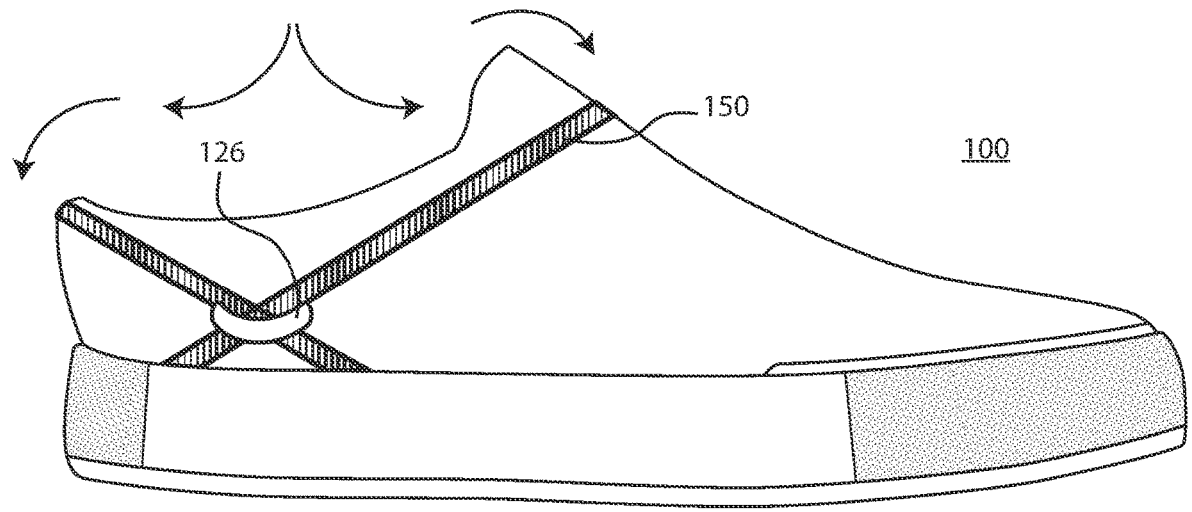
Figure 10A:
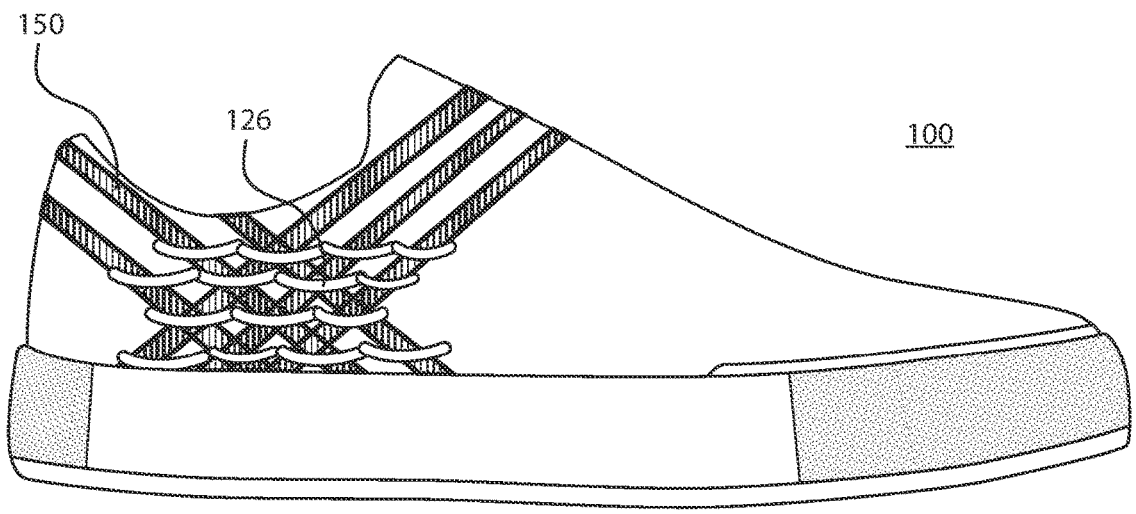
FIGS. 10A and 10B illustrate an example embodiment of a rapid-entry shoe having a plurality of tethers, in uncollapsed and collapsed configurations, respectively.
Figure 10B:
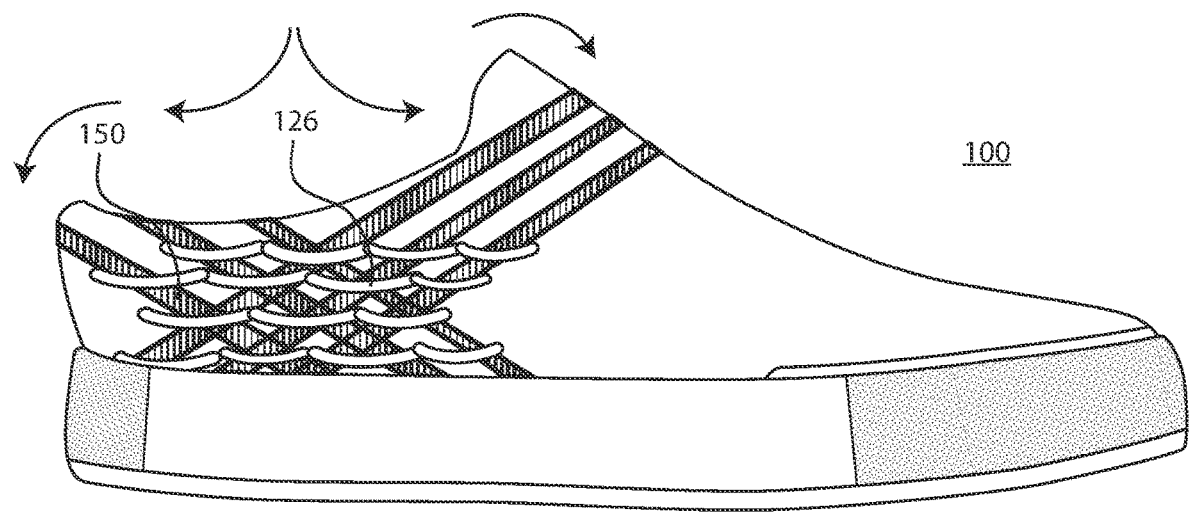

With reference now to FIGS. 8A and 8B, in other embodiments, the crossing point of a plurality of arms can remain substantially constant when a rapid-entry shoe 100 is moving between collapsed and uncollapsed configurations. To accomplish the foregoing, a tether 126 (e.g., elastic loop, strap, net or knit through or around) can be used to secure the plurality of arms 150, for example, around, at or near the crossing point (FIG. 8A) or away from the crossing point (FIG. 8B). In connection with the foregoing, and with reference to FIGS. 9A, 9B, 10A and 10B, such a tether 126 may further contribute to the rapid-entry shoe 100 being biased to return from a collapsed configuration (FIGS. 9B and 10B) to an uncollapsed configuration (FIGS. 9A and 10A). Stated differently, a tether 126 can provide rebound and return an arm from a collapsed configuration to an uncollapsed configuration.

Figure 11A:
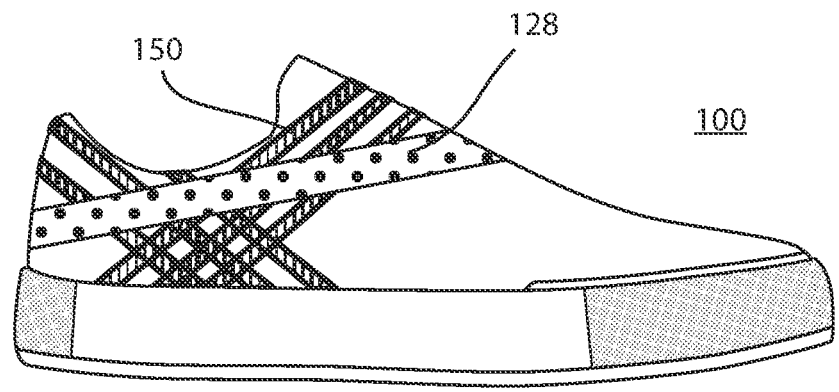
FIGS. 11A-11C illustrate bands of example embodiments of the present disclosure.
Figure 11B:
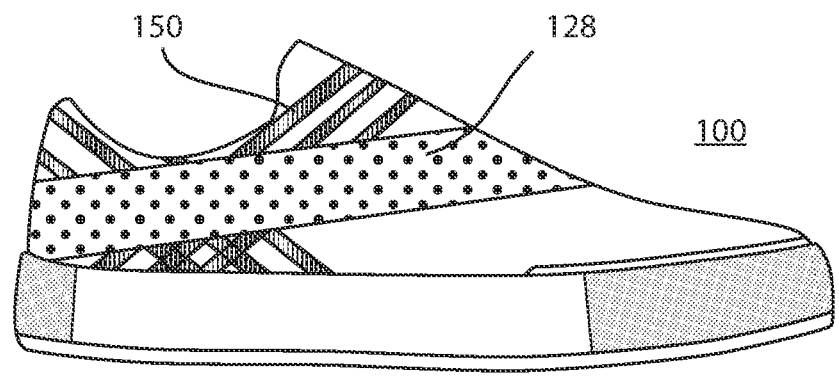
Figure 11C:
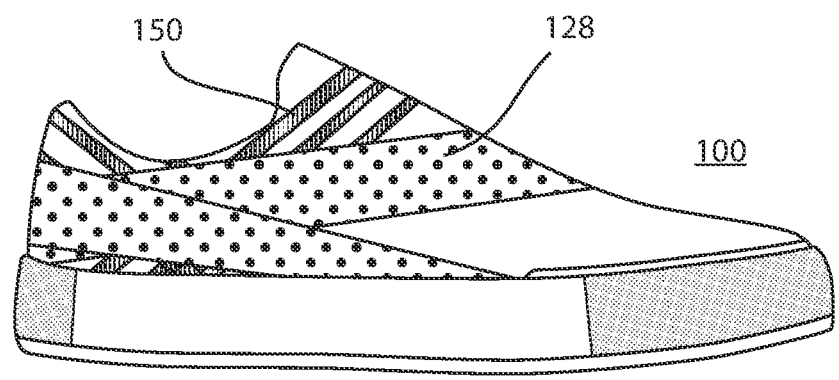

Still further, with reference to FIGS. 11A-11C, in example embodiments of the present disclosure, one or more elastic bands 128 (or straps), e.g., 1, 2, 3 4 or more, can be wrapped around the upper of rapid-entry shoe 100 to pull a plurality of arms toward one another and thereby bias the opening to return from a collapsed configuration to an uncollapsed configuration. Alternatively, one or more elastic bands 128, e.g., 1, 2, 3 4 or more, may be on a single side of a rapid-entry shoe 100.

Figure 12:
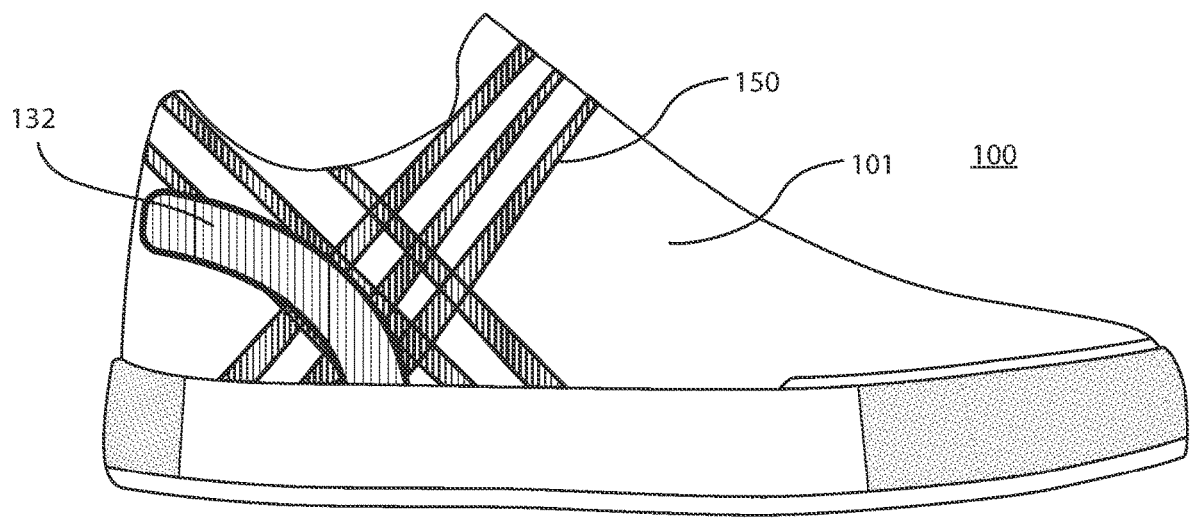
FIG. 12 illustrates an alternate embodiment comprising a support element in accordance with example embodiments of the present disclosure.

With reference to FIG. 12, a support element 132 can be integrated into the upper 101 to bias the opening of rapid-entry shoe 100 to return from a collapsed configuration to an uncollapsed configuration. In connection with the foregoing, support element 132 can be deformable or rigid.

In some example embodiments, tension in an arm can be adjusted, for example, by cinching and/or adjusting the location of the coupling (e.g., a hook and loop coupling) between the arm and a sole portion 103 or at or adjacent to a topline 112, or by cinching and/or adjusting a resilient textile or elastic gore or member as described supra.

It will be apparent to those skilled in the art that various modifications and variations can be made in the present disclosure without departing from the spirit or scope of the disclosure. Thus, it is intended that the embodiments described herein cover the modifications and variations of this disclosure provided they come within the scope of the appended claims and their equivalents.

Numerous characteristics and advantages have been set forth in the preceding description, including various alternatives together with details of the structure and function of the devices and/or methods. The disclosure is intended as illustrative only and as such is not intended to be exhaustive. It will be evident to those skilled in the art that various modifications can be made, especially in matters of structure, materials, elements, components, shape, size and arrangement of parts including combinations within the principles of the invention, to the full extent indicated by the broad, general meaning of the terms in which the appended claims are expressed. To the extent that these various modifications do not depart from the spirit and scope of the appended claims, they are intended to be encompassed therein.

We claim:

1. A rapid-entry shoe comprising:
a sole portion;
an upper coupled to the sole portion, the upper defining a topline; and
a plurality of arms, each arm coupled adjacent to the sole portion and extending adjacent to the topline;
wherein the rapid-entry shoe has a collapsed configuration in which the topline is expanded to facilitate reception of a foot of an individual donning the rapid-entry shoe;
wherein the rapid-entry shoe has an uncollapsed configuration in which the topline is unexpanded to retain the foot within the rapid-entry shoe;
wherein at least two of the plurality of arms cross at a crossing point and wherein the crossing point changes between the collapsed configuration and the uncollapsed configuration such that the at least two of the plurality of arms slide along their respective lengths past each other between the collapsed configuration and the uncollapsed configuration; and
wherein the rapid-entry shoe is biased by the plurality of arms toward the uncollapsed configuration.

2. The rapid-entry shoe of claim 1, wherein the arms are separated by a negative space, the negative space being greater in the collapsed configuration than in the uncollapsed configuration.

3. The rapid-entry shoe of claim 1, wherein the sole portion is comprised of a material that does not permit elongation between the plurality of arms at the sole portion.

4. The rapid-entry shoe of claim 1, wherein the topline is comprised of a material that does permit elongation between the plurality of arms at the topline.

5. The rapid-entry shoe of claim 1, wherein at least one arm is coupled to a forward portion of the topline and at least one arm is coupled to a rearward portion of the topline, to thereby draw the forward portion and the rearward portion toward one another in the uncollapsed configuration.

6. The rapid-entry shoe of claim 1, wherein a pattern woven or stitched into the upper contributes to the rapid-entry shoe being biased toward the uncollapsed configuration.

7. The rapid-entry shoe of claim 1, wherein at least one of the plurality of arms extends continuously between lateral and medial sides of the rapid-entry shoe.

8. The rapid-entry shoe of claim 1, wherein at least one of the plurality of arms extends from adjacent to the sole portion and terminates adjacent to the topline of the rapid-entry shoe.

9. A rapid-entry shoe comprising:
a sole portion;
an upper coupled to the sole portion, the upper defining a topline; and
a portion of the upper comprising a plurality of arms, each arm coupled adjacent to the sole portion and extending adjacent to the topline;
wherein the rapid-entry shoe has a collapsed configuration in which the topline is expanded to facilitate reception of a foot of an individual donning the rapid-entry shoe;
wherein the rapid-entry shoe has an uncollapsed configuration in which the topline is unexpanded to retain the foot within the rapid-entry shoe;
wherein at least two of the plurality of arms cross at a crossing point and wherein the crossing point changes between the collapsed configuration and the uncollapsed configuration such that the at least two of the plurality of arms shear past each other between the collapsed configuration and the uncollapsed configuration; and
wherein the rapid-entry shoe is biased by the plurality of arms toward the uncollapsed configuration.

10. The rapid-entry shoe of claim 8, wherein the arms are separated by a negative space, the negative space being greater in the collapsed configuration than in the uncollapsed configuration.

11. The rapid-entry shoe of claim 8, wherein the sole portion is comprised of a material that does not permit elongation between the plurality of arms at the sole portion.

12. The rapid-entry shoe of claim 8, wherein the resilient textile is comprised of a material that does permit elongation between the plurality of arms.

13. The rapid-entry shoe of claim 8, wherein at least one arm is coupled to a forward portion of the topline and at least one arm is coupled to a rearward portion of the topline, to thereby draw the forward portion and the rearward portion toward one another in the uncollapsed configuration.

14. The rapid-entry shoe of claim 8, wherein a pattern woven or stitched into the upper contributes to the rapid-entry shoe being biased toward the uncollapsed configuration.

15. The rapid-entry shoe of claim 8, wherein at least one of the plurality of arms extends continuously between lateral and medial sides of the rapid-entry shoe.

16. The rapid-entry shoe of claim 8, wherein at least one of the plurality of arms extends from adjacent to the sole portion and terminates adjacent to the topline of the rapid-entry shoe.

17. A rapid-entry shoe comprising:
a sole portion;
an upper coupled to the sole portion, the upper defining a topline;
a plurality of crossing arms, each arm of the plurality of crossing arms coupled adjacent to the sole portion and extending adjacent to the topline, and a first arm of the plurality of crossing arms crossing a second arm of the plurality of crossing arms at a crossing point;
wherein, when the topline of the rapid-entry shoe is compressed toward the sole portion, the crossing point changes and the first and second arms of the plurality of crossing arms are configured to expand an opening of the rapid-entry shoe.

18. The rapid-entry shoe of claim 17, wherein the sole portion is comprised of a material that does not permit elongation between the plurality of crossing arms at the sole portion.

19. The rapid-entry shoe of claim 17, wherein the upper is comprised of a material that does permit elongation between the plurality of crossing arms.

20. The rapid-entry shoe of claim 17, wherein at least one of the plurality of crossing arms extends continuously between lateral and medial sides of the rapid-entry shoe.

* * * * *